(12) United States Patent
Rose et al.

(10) Patent No.: US 11,097,493 B2
(45) Date of Patent: Aug. 24, 2021

(54) FOAM HEATING SYSTEM

(71) Applicants: Robert J. Rose, Richmond, VA (US); Andrew T. Sinclair, Richmond, VA (US); Ian L. Churcher, Richmond, VA (US)

(72) Inventors: Robert J. Rose, Richmond, VA (US); Andrew T. Sinclair, Richmond, VA (US); Ian L. Churcher, Richmond, VA (US)

(73) Assignee: Worthen Industries, Nashua, NH (US)

( * ) Notice: Subject to any disclaimer, the term of this patent is extended or adjusted under 35 U.S.C. 154(b) by 0 days.

(21) Appl. No.: 16/877,557

(22) Filed: May 19, 2020

(65) Prior Publication Data

US 2020/0276767 A1 Sep. 3, 2020

Related U.S. Application Data

(63) Continuation of application No. 15/442,931, filed on Feb. 27, 2017, now Pat. No. 10,688,728.

(Continued)

(51) Int. Cl.
*B29C 65/10* (2006.01)
*B29C 65/00* (2006.01)
(Continued)

(52) U.S. Cl.
CPC ............ *B29C 65/10* (2013.01); *B29C 65/486* (2013.01); *B29C 65/526* (2013.01); *B29C 65/787* (2013.01); *B29C 66/0242* (2013.01); *B29C 66/1122* (2013.01); *B29C 66/45* (2013.01); *B29C 66/727* (2013.01); *B32B 27/065* (2013.01); *B32B 37/06* (2013.01); *B32B 37/1284* (2013.01); *B29C 63/02* (2013.01); *B29C 65/1412* (2013.01); *B29C 65/18* (2013.01); *B29C 65/482* (2013.01); *B29C 65/483* (2013.01); *B29C 65/522* (2013.01); *B29C 66/71* (2013.01); *B29C 66/712* (2013.01); *B29C 66/73521* (2013.01); *B29C 66/919* (2013.01); *B29C 66/91411* (2013.01); *B29C 66/949* (2013.01); *B29C 2063/485* (2013.01);

(Continued)

(58) Field of Classification Search
CPC ..... B29C 65/10; B29C 65/486; B29C 65/526; B29C 65/787; B29C 66/0242; B29C 66/1122; B29C 66/45; B29C 66/727; B32B 27/065; B32B 37/06; B32B 37/1284

See application file for complete search history.

(56) References Cited

U.S. PATENT DOCUMENTS 3,906,134 A * 9/1975 Pohl .................... B29C 66/0222
428/206
5,938,878 A * 8/1999 Hurley ..................... A43B 5/08
156/219

(Continued)

*Primary Examiner* — Daniel McNally
(74) *Attorney, Agent, or Firm* — Lambert Shortell & Connaughton; David J. Connaughton, Jr.; Justin P. Tinger

(57) ABSTRACT

A foam assembly system is provided. The system is configured to heat a surface of foam. After the heating of the foam, an adhesive is applied, typically a high solids adhesive. The foam is then bonded to another foam surface. It has been found that the pre-heating of the foam before adhesive application greatly enhances the bond strength between the foam and the second foam surface to which it is adhered.

16 Claims, 1 Drawing Sheet

Related U.S. Application Data

(60) Provisional application No. 62/428,703, filed on Dec. 1, 2016.

(51) Int. Cl.
*B29C 65/78* (2006.01)
*B29C 65/48* (2006.01)
*B29C 65/52* (2006.01)
*B32B 37/06* (2006.01)
*B32B 37/12* (2006.01)
*B32B 27/06* (2006.01)
*B29C 63/02* (2006.01)
*B29C 63/48* (2006.01)
*B29C 65/14* (2006.01)
*B29C 65/18* (2006.01)

(52) U.S. Cl.
CPC ....... *B32B 2250/02* (2013.01); *B32B 2250/22* (2013.01); *B32B 2305/022* (2013.01)

(56) References Cited

U.S. PATENT DOCUMENTS

| | | | | |
|---|---|---|---|---|
| 5,962,147 A * | 10/1999 | Shalub | ...................... | A61F 6/04 428/440 |
| 7,240,386 B1 * | 7/2007 | McKay | ................ | A47C 21/044 5/423 |
| 2005/0136238 A1 * | 6/2005 | Lindsay | .................... | B32B 5/18 428/304.4 |

\* cited by examiner

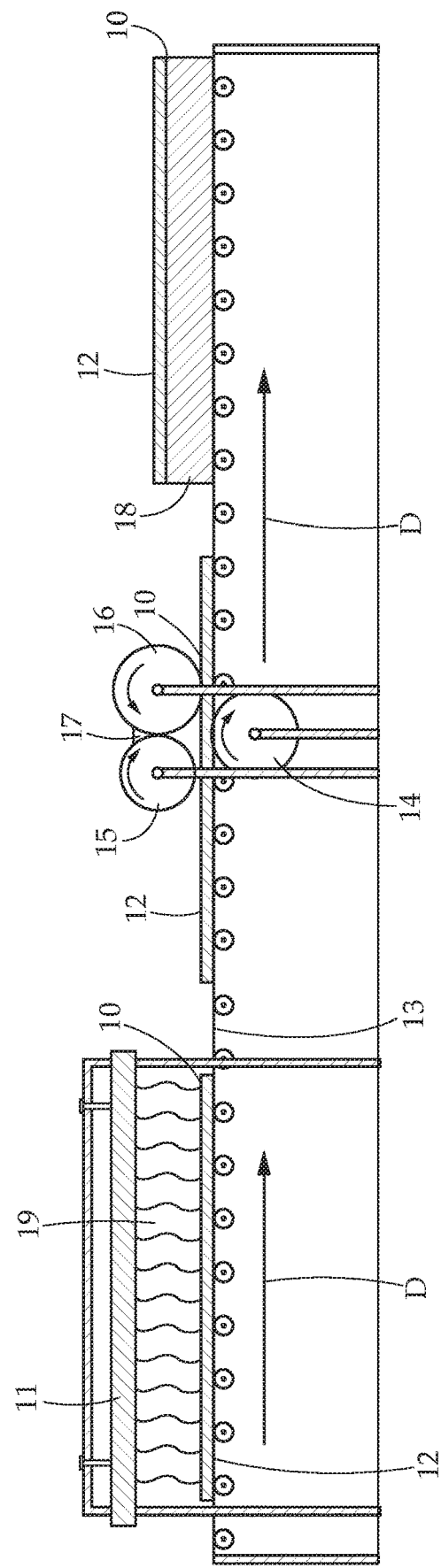

FOAM HEATING SYSTEM

BACKGROUND

In foam assembly processes, such as foam mattress assembly, water based adhesives provide a safe, effective, and non-hazardous solution for bonding foam pieces together. However, many water based adhesives contain a large percentage of water. Therefore if a foam assembly bonded with water-based adhesives is packaged before fully dried, mold, unpleasant odors, substrate material breakdown, and the like may develop.

In particular, in foam mattress assembly and other assembled foam products, a fast growing trend in industry is to compress said assemblies into a box that may be shipped directly to customers. The boxes are sized such that traditional package shipping companies can handle them. These foam assemblies are constructed, and then enclosed in an impermeable plastic bag which is vacuumed and compressed so that it fits into the shipping boxes. Vacuuming alone to compress the package does not adequately extract water from the package, so trapped moisture is a common occurrence. Currently, the primary solution for this problem is to simply let the assemblies rest for a certain time period after construction to let moisture evaporate. However, this slows down the manufacturing and shipping process, and requires extra storage space at the manufacturing site.

One solution to minimize the presence of water or other solvents is to use a high solids adhesive, such as that in the range of 60% or more solids, typically 60-80% solids. However, high solids adhesives do not have sufficient wet tack for many foam assembly processes. Wet tack allows adhesive to rapidly hold the foam pieces together during assembly and also allows for some stretching of the foam when making the assembly. Further still, high solids adhesives do not provide a strong enough bond between foam elements to achieve foam tear when processing at room temperature.

Therefore, what is needed is a system that may allow for enhanced processing of foam assembly components and adhesives to allow for use of a high solids adhesive that achieves foam tear level adhesion of foam components.

SUMMARY

The subject matter of this application may involve, in some cases, interrelated products, alternative solutions to a particular problem, and/or a plurality of different uses of a single system or article.

In one aspect, the present invention involves a system and method for heating a surface of a foam piece before adhesive is applied to the surface a second foam surface is then adhered to the foam piece. This system results in better reception of the adhesive by the foam, enhances the wet tack of the adhesive, and forms superior final bonds for the foam assemblies having foam adhered together when compared to processing using similar adhesives at ambient conditions.

BRIEF DESCRIPTION OF THE FIGURES

FIG. 1 provides a side view of a foam assembly system of the present invention.

DETAILED DESCRIPTION

The present invention concerns an apparatus to minimize or eliminate water from a foam assembly that also achieves very good bond strength between foam layers.

The present invention involves a system and method for heating a surface of a foam (referred to as "preheating the foam:"), applying an adhesive, such as a high solids adhesive (used herein to refer to adhesives having greater than approximately 60% solids), to the heated surface of the foam, and then applying a second foam surface to the heated surface having adhesive on it. As such, the two foam surfaces may be adhered together, forming a foam assembly.

As used herein, a "foam assembly" may be any assembly that comprises two or more foam pieces laminated together using an adhesive. It is even possible that a foam assembly may be a single foam element for example, by having two surfaces adhered together. Foam assemblies may be any size, shape, foam type(s), and configuration, without straying from the scope of the present invention.

As used herein, the term "foam tear" means that adhesion between foam layers is such that separation cannot occur without destruction (tearing) of the foam layers. This typically occurs in the form of deep tears—indicating very good adhesion, some tearing or shallow tearing-indicating moderate adhesion, or no tearing, indicating incomplete adhesion.

As shown in FIG. 1, the present invention shows an embodiment of a system using the inventive method contemplated herein. While this embodiment is shown in an assembly conveyor embodiment, it should be understood that the invention may be carried out in steps without being on a conveyor system without straying from the scope of this invention. Arrows D demonstrate the direction of travel of the foam piece 12 along the system. Initially, foam 12 is heated by a heat source 11, which raises the temperature of a top surface 10 of the foam 12 above ambient temperature. In one embodiment, the heat source 11 raises a surface 10 temperature of the foam 12 to approximately 220-300 Fahrenheit, although different temperatures may be achieved depending on embodiment. The foam piece 12 is then moved by a conveyor, rollers, or the like, or is otherwise physically moved to an adhesive application area. An adhesive roller system 14, 15, 16, 17 is positioned down stream from the heat source 11. The adhesive roller system includes a primary roller 16, secondary roller 15, support roller 14 and a trough 15 filled with the adhesive. The primary roller 16 rolls over the adhesive in trough 17, coating the roller 16 with adhesive, the primary roller 16 then applies this adhesive to the foam 12 beneath as it rolls over the heated surface 10. It should be understood that while roll coating is used in this FIGURE, any other adhesive application method (spraying, brushing, contact application, and the like) may be used without straying from the scope of the present invention. The adhesive typically may be a high solids adhesive such as an adhesive having 60% solids, or 60-80% solids, but this is not required. After the coating of the adhesive on the heated foam surface, the foam layer 12 with adhesive applied is adhered to another foam layer 18. In the embodiment shown in the FIGURE, the foam 12 having adhesive applied is flipped over and laminated to a second core foam 18 so that the foam 12 top surface 10 is bonded to second foam core 18. In some embodiments, the two foam pieces 12, 18 may be compressed together to enhance bonding, but that is not necessarily required. Compression may be achieved by a force applying device that urges the pieces 12, 18 towards each other; vacuum packaging the foam assembly, stacking the foam assembly on other assemblies; flipping the assembly if second core foam 18 is heavier than foam 12, and the like.

The heat source may be any structure capable of increasing the temperature of a surface of foam. For example, a convection heat source, infra-red heat source, direct contact conduction heat source, and the like. In a particular further embodiment, a fan or other air moving structure may force air, such as heated air shown in FIG. 1 as 19, towards the foam.

The present invention has, in initial tests, provided drastically enhanced performance compared to the prior art methods of roll coating adhesives on foam surfaces without any pre-heating. To test the effectiveness of the present invention, tests were performed to compare bond strength of preheated foam of the present invention with ambient treatment in the prior art. A high solids adhesive was applied with an adhesive roller to 12"×18" pieces of 3 lb. viscoelastic foam which were then adhered to conventional polyurethane core foam (such as mattress core foam). Foam samples that were not preheated (marked as "N" in the pre-heated column) were heated after the adhesive was applied, and there was no foam tear in two out of three of these samples, with the sample having tear using a high amount of adhesive and having only partial tear. Therefore, the step of heating the foam before adhesive is applied can be seen to be especially advantageous. Assembly was immediate after adhesive application, and the two foam pieces were compressed together for ten seconds.

TABLE 1

Comparison of Foam Tear Between Preheated and Non-heated Foam

| Preheated (Y/N) | Surface Temperature | Dwell Time | g/yd$^2$ | Foam tear after 3 hours |
|---|---|---|---|---|
| Y | 280° F. | 30 sec | 72 | Deep |
| Y | 240° F. | 20 sec | 108 | Deep |
| Y | 260° F. | 10 sec | 72 | Deep |
| Y | 270° F. | 10 sec | 72 | Deep |
| Y | 260° F. | 30 sec | 72 | Deep |
| Y | 230° F. | 10 sec | 72 | Deep |
| N | 160° F. | 10 sec | 72 | None |
| N | 140° F. | 5 sec | 72 | None |
| N | 140° F. | 10 sec | 108 | Some |

Table 2 shows results of varying heating dwell time (dwell time column); adhesive density (g/yd$^2$ column); varied foam types (Type of foam column); wait time between adhesive application and assembly to the second foam surface (Time before assembly column); and the time required for the adhesive to dry/cure sufficiently to provide foam tear (Time until foam tear column). It can be seen in all foam preheating embodiments that foam tear occurred within thirty minutes, and typically much less than that. As with Table 1, the second foam is a conventional polyurethane core foam (such as mattress core foam) while the foam laminated thereto (which is heated to the identified surface temperature, and then adhesive is applied) may vary. High solids adhesives were applied to surfaces of 12"×12" foam pieces.

TABLE 2

Foam Tear Timing under Different Conditions

| Surface Temperature | Dwell Time | g/yd$^2$ | Type of foam laminated to core foam | Time before assembly | Time until foam tear. |
|---|---|---|---|---|---|
| 245° F. | 15 sec | 50 | Visco | 40 sec | >6 min <35 min |
| 240° F. | 15 sec | 55 | Visco | Immed. | <18 min |
| 260° F. | 15 sec | 70 | Polyurethane Foam-low permeability | 40 sec | <20 min |
| 240° F. | 10 sec | 70 | Polyurethane Foam-low permeability | 30 sec | <10 min |
| 280° F. | 20 sec | 70 | Polyurethane Foam-low permeability | Immed. | <30 min |
| 240° F. | 10 sec | 70 | Polyurethane Foam-low permeability | Immed. | <30 min |
| 275° F. | 20 sec | 70 | Polyurethane Foam-low permeability | 60 sec | <7 min |
| 240° F. | 10 sec | 70 | Polyurethane Foam-low permeability | 60 sec | <10 min |
| No preheat | N/A | 70 | Polyurethane Foam-low permeability | 60 sec | <40 min |

Table 3 provides further testing to determine when foam tear occurs. In this table, high solids adhesive is applied with an adhesive roller system to 12"×16" 3 lb. viscoelastic foam. Samples were evaluated within ten minutes of assembly. Assembly of the two foam surfaces occurred 30 seconds after adhesive application, with a ten second compression of the foam surfaces towards each other after adhesion.

TABLE 3

Foam Tear Timing Based On Surface Temperature

| Preheated (Y/N) | Surface Temperature | Dwell Time | g/yd$^2$ | Time until foam tear |
|---|---|---|---|---|
| Y | 280° F. | 30 sec | 54 | 4 min |
| Y | 280° F. | 30 sec | 54 | 5 min |
| Y | 255° F. | 20 sec | 54 | 7 min |
| Y | 250° F. | 20 sec | 54 | 8 min |
| Y | 250° F. | 20 sec | 54 | 10 min |

In additional testing with low solids adhesive formulations, heating of the foam surface before adhesive application resulted in foam tear one hour after adhesion. By contrast, previous testing with non-preheated foam and a low solids adhesive formulation required approximately four hours post drying before foam tear occurred.

As can be seen herein, preheating foam before adhesive application gives adhesive applied to the preheated foam both faster wet tack and faster, stronger bond development. The application of a high solids adhesive means that less water is added to the foam assembly than with traditional water based adhesives.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention.

What is claimed is:

1. A method of foam assembly comprising the steps of:
heating a top surface of a piece of foam using a heater;
applying a quantity of adhesive directly to the heated top surface of the piece of foam; and
adhering the top surface of the foam piece to a second foam piece before the adhesive has dried.

2. The method of foam assembly of claim 1 wherein the step of applying the quantity of adhesive comprises roll coating the top surface.

3. The method of claim 2 wherein the step of roll coating is achieved by an adhesive roller system comprising a primary roller which rolls over adhesive in a trough and applies the adhesive to the top surface of the foam, a secondary roller, and a support roller.

4. The method of foam assembly of claim 1 further comprising the step of conveying a piece of foam along a conveyor.

5. The method of foam assembly of claim 1 wherein an adhesive applicator applies a high solids adhesive.

6. The method of foam assembly of claim 1 wherein an adhesive applicator applies a high solids adhesive having 60-80% solids.

7. The method of foam assembly of claim 1 wherein the step of heating the surface comprises heating the surface of the foam to a temperature of approximately 220-300 F.

8. The method of foam assembly of claim 1 wherein the heater is a convection heater.

9. The method of foam assembly of claim 1 wherein the step of heating the surface comprises heating the surface of the foam to a temperature of approximately 250 F.

10. The method of foam assembly of claim 1 further comprising a step of compressing the foam and the second foam piece together.

11. The method of foam assembly of claim 1 wherein the piece of foam is a viscoelastic foam.

12. The method of foam assembly of claim 1 wherein the piece of foam is a polyurethane core foam.

13. The method of claim 1 further comprising a step of vacuum packaging the adhered foam piece and second foam piece.

14. The method of claim 1 further comprising a step of allowing the quantity of adhesive to dry after the step of adhering the top surface of the foam piece to the second foam piece.

15. The method of claim 1 wherein the step of adhering the top surface of the foam piece to a second foam piece is performed within one minute from the step of applying the quantity of adhesive.

16. The method of claim 1 wherein the step of applying a quantity of adhesive directly to the heated top surface of the piece of foam improves wet tack of the adhesive and increases bond strength.

* * * * *